July 2, 1935.  D. D. HUBBELL  2,006,640
MULTIFOCAL OPHTHALMIC LENS
Filed June 14, 1933   3 Sheets-Sheet 1

INVENTOR.
Daniel D. Hubbell.
BY
ATTORNEYS.

July 2, 1935.  D. D. HUBBELL  2,006,640
MULTIFOCAL OPHTHALMIC LENS
Filed June 14, 1933  3 Sheets-Sheet 2

INVENTOR.
Daniel D. Hubbell.
BY
ATTORNEYS.

July 2, 1935.  D. D. HUBBELL  2,006,640
MULTIFOCAL OPHTHALMIC LENS
Filed June 14, 1933   3 Sheets-Sheet 3

INVENTOR.
Daniel D. Hubbell.
BY
ATTORNEYS.

Patented July 2, 1935

2,006,640

UNITED STATES PATENT OFFICE 2,006,640

MULTIFOCAL OPHTHALMIC LENS

Daniel D. Hubbell, Columbus, Ohio

Application June 14, 1933, Serial No. 675,800

8 Claims. (Cl. 88—54)

My invention relates to multifocal ophthalmic lenses. It has to do particularly with bifocal lenses, although it is capable of application to lenses having more than than two fields of vision.

In the prior art, various efforts have been made to produce a satisfactory one-piece multifocal ophthalmic lens. However, the lenses resulting from these efforts have all involved structural and optical disadvantages which have either prevented marketing or greatly restricted the demand for such lenses.

One type of one-piece multifocal ophthalmic lenses which has been marketed has embodied a reading segment embodying the upper part of a circle so that the dividing line between the reading portion and the distance portion is of arcuate form. In this type, the optical center of the reading portion is located at a marked distance below the dividing line.

One resulting disadvantage is that the eye experiences an apparent "jump of the image" when it passes from the reading field to the distance field or vice versa together with blur at and adjacent to this dividing line. Another disadvantage arises from the fact that the dividing line between the reading field and the distance field is arcuate, which results in a laterally restricted field of vision on either side of any point at which the vision crosses the dividing line.

It has been suggested that the reading segment be made in the form of a half circle with the flat side uppermost in the lens, with the optical center thereof at this dividing line and with the arcuate edge of the segment merging with the distance field. The advantages claimed for this construction involve the avoidance of "jump of the image", avoidance of blur at the dividing line and a wider field of vision immediately below the dividing line.

But this construction possesses certain important drawbacks. Chief among these is the pronounced shoulder at the dividing line with its tendency to collect dirt and create glare.

One of the objects of my invention is to provide a one-piece bifocal lens having a reading portion with a relatively elongated and substantially straight upper edge or dividing line so as to provide a relatively wide field of vision immediately below the dividing line while, at the same time, greatly decreasing or eliminating the shoulder at the dividing line.

Another object of this invention is to provide a one-piece bifocal lens which has a reading portion with the characteristics indicated and which is, at the same time, free from undue jumping or displacement of the image.

Another object of this invention is to provide a one-piece bifocal lens which combines the characteristics indicated with a wider range of adaptability for prescribed corrections.

Various other objects will appear as this description progresses.

In its preferred embodiment, my invention comprises a one-piece bifocal lens wherein the upper edge of the reading segment is comparatively flat and is located a slight distance below the geometrical center of the lens. Also, this reading segment preferably extends to the base of the lens and is of substantial width throughout its area and even at the base of the lens. These characteristics may, however, be altered and may be supplemented by other characteristics and advantageous features which will appear as this description progresses.

This application is a continuation, in part, of my application for Multifocal lenses and method of making the same, filed November 19, 1931, Serial No. 576,071.

Before describing the lenses preferably produced in accordance with the principles of my invention, I deem it advisable to describe the method which is preferably used in the production of the lenses and the characteristics of the blanks in the various phases of formation which ultimately result in attainment of the object sought. This description will be supplemented by more or less diagrammatic drawings appended hereto. In these drawings, similar characters of reference designate corresponding parts.

Figure 1:
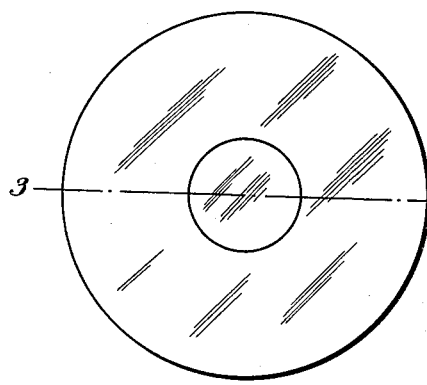
Figure 1 is a diagrammatic plan view of the concave side of a semi-finished blank showing a central circular portion representing the theoretical area from which the partially circular reading segment is to be formed.
Figure 2:
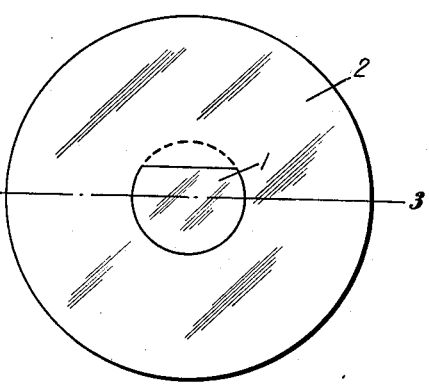
Figure 2 is a diagrammatic plan view similar to Figure 1 and showing the partially circular reading segment button from which the reading segment is to be cut in the final cutting of the lens, the dotted line representation being the portion of the theoretical circle which is not actually formed on the blank.

In the making of this lens, I preferably provide a blank which is molded to have two surfaces of different curvature on one side thereof, a minor surface and a major surface. The minor surface is raised somewhat above the major surface and has an external contour of more than a half circle and less than a full circle, as illustrated by the full line at 1 in Fig. 2. The blank is then mounted on a turntable with its bifocal surface projecting upwardly and with the center of the reading segment located on the axis of rotation of the table.

A grinding tool is then brought to bear upon the surface 2 which surrounds the surface 1 and which is to ultimately form the concave surface of the distance vision portion of the lens. As the table rotates, the tool is brought closer to or further from the raised minor portion so as to grind not only the surface of the distance portion but also to grind the top edge of the minor portion 1. Polishing of the distance portion may be effected by similar means. The result of this operation is to impart to the minor portion a sharply defined outline of partially circular form, larger than a half circle and less than a full circle.

The minor surface may then be finished to produce the reading segment. This may be done in several ways, depending upon whether or not the semi-circular part of the portion 1 is to merge with the adjacent distance vision portion or to form a shoulder projecting therefrom. One method which may be used is to provide a collar with a hole therethrough of such a size that the collar will fit snugly around the minor portion. The collar should preferably cover and protect the distance vision portion. It has a thickness approximating the height of the wall formed on the rough blank. The ring is preferably cemented to the distance portion. The protective collar may be of glass, hard wax or plastic material and may be subsequently removed in various ways.

The reading segment is then finished by grinding and polishing in a manner similar to that used in forming a one-piece bifocal lens blank of the usual one-piece type, the collar acting as a support for the lap over that portion of the distance vision area adjacent the flat dividing line. When the surface is finished, this collar will be ground through or practically so along an arcuate line which is a continuation of the semi-circular boundary line of the segment. Within the arcuate line and extending to the dividing line, there will be a thin wedge-shaped wafer left adjacent the flat dividing line. The circular ring remaining and the wafer are removed, whereupon the semi-finished lens blank is finished on the bifocal side. The semi-circular dividing line forms a common line with both the reading and distance portions but a shoulder is present at the flat top which is shaped like a double wedge, thickest at the center and pointed at the ends.

Though the minor portion of the blank is preferably not formed as a complete circle, the advantages of this invention will be best understood by considering the reading segment as though it had been cut from a segment button of circular form with a horizontal diameter line indicated at 3—3 of Figures 1 to 4, inclusive. By reference to Figure 3, it will be noted that the reading segment button 1 is an integrally formed portion whose thickest section is on the horizontal diameter line 3—3. It will also be noted that as this reading segment button departs from this horizontal diameter line, it decreases in thickness.

Figure 6:
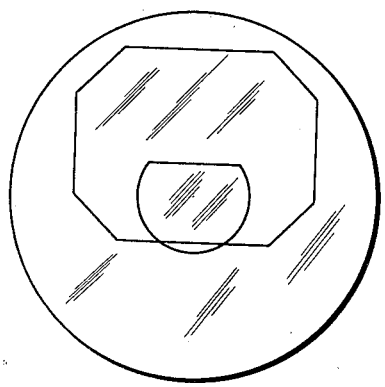
Figure 6 is a plan view of the concave side of the blank such as shown in Figures 3 and 4 with the outline of a lens placed thereon to show the portion of the reading segment button which is preferably eliminated in the cutting of the lens to final contour, for a purpose which will be more apparent as this description progresses.

I have utilized this fact to reduce the size of the shoulder 4 at the dividing line between the reading segment button and the distance portion. In other words, if the reading segment button had been terminated at the horizontal dividing line 3—3, the shoulder formed would be of maximum thickness. By extending the reading segment a substantial distance above this horizontal diameter line, I have substantially decreased the height of the shoulder 4. If desired, I may cut the lens from the blank shown in Figure 3 along the lines illustrated in Figure 6.

Figures 3, 4:
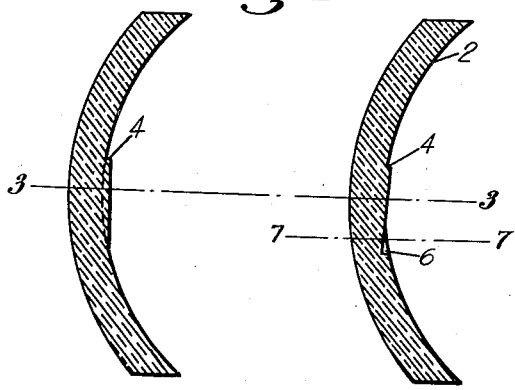
Figure 3 is a vertical sectional view of the blank shown in Figure 2.
Figure 4 is a sectional view similar to Figure 3 showing a subsequent stage in the formation of the blank.
Figure 5:
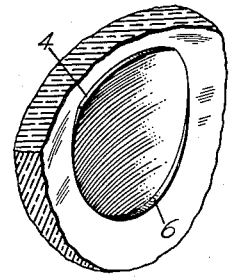
Figure 5 is a perspective view of a portion of the blank of Figure 4, this view illustrating the partially submerged condition of the reading segment in such blank.
Figure 7:
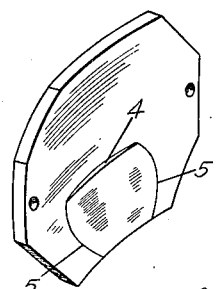
Figure 7 is a perspective view of a lens produced from the blank of Figure 3 by cutting along the lines shown in Figure 6.

A lens made from the blank shown in Figure 3 is illustrated by the perspective view shown in Figure 7. In this figure, it will be seen that the shoulder 4 is of slight height and that it merges at its ends with the distance portion of the lens. The arcuate edges 5 of this reading segment are shown to be merging throughout with the distance portion surface. Preferably, however, I continue the grinding of the reading segment portion with the axis of the grinding tool at an angle so that there is produced the condition illustrated in Figure 4 wherein the shoulder 4 is practically eliminated while the lower part of the segment is submerged below the surrounding surface of the distance portion as at 6.

When this minor surface is formed as shown in Figure 4 and properly ground and polished, a lens is cut from the blank so as to eliminate the lower portion of the minor surface of Figure 4, as illustrated in Figure 7 and by the line of cutting 7—7 of Figure 4. It will be noted that this eliminates a substantial portion of the submerged area, which portion forms the area of greater submergence.

Figure 8:
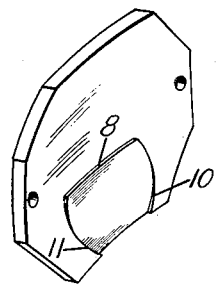
Figure 8 is a perspective view of a lens which is cut from a blank having the form shown in Figure 4 along the lines indicated in Figure 6.

The result of this operation is the production of a lens such as shown in Figure 8 wherein the reading segment has, at the dividing line, a shoulder 8 of insignificant height which merges at its ends with the surrounding surface of the distance portion. As will also be noted in this figure, the reading segment extends to the bottom of the lens and has a relatively wide area at this point. Likewise, the slight submergence at the lower part of the segment produces extremely slight shoulders 10 and 11.

It will be seen from this description that I have devised a method of producing a one-piece bifocal lens which permits the reduction and even the practical elimination of the shoulder at the dividing line. This may be accomplished merely by extending the reading segment portion a substantial distance above the horizontal diameter line of the circle or by submerging the lower portion of the reading segment or by both. The elimination of the lower part of the submerged area reduces the shoulders at the lower part of the segment sides to immaterial height.

Figure 9:
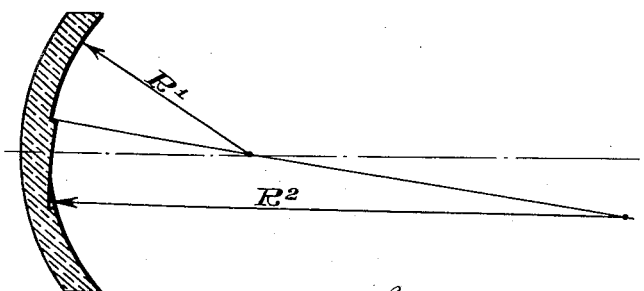
Figure 9 is a diagrammatic representation of a lens blank such as shown in Figure 4 with the center of curvature of the inner surface of the reading segment so located that the optical center of the reading segment is on the dividing line between the reading portion and the distance portion.
Figure 10:
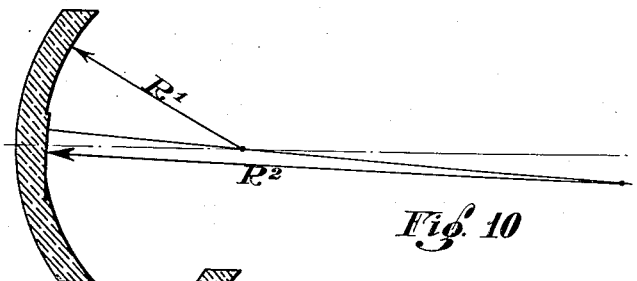
Figure 10 is a view similar to Figure 9 with the center of curvature of the inner surface of the reading portion so located that the optical center of the reading segment is below the dividing line.
Figure 11:
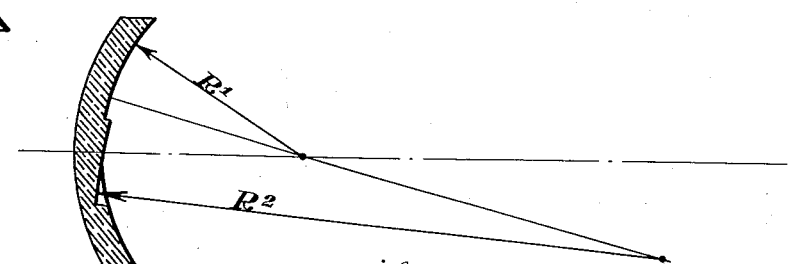
Figure 11 is a view similar to Figure 9 with the center of curvature of the inner surface of the reading segment so located that the optical center of the reading segment is above the dividing line.

I may readily locate the optical center of the reading segment at the dividing line, below the dividing line or above the dividing line, as desired, by altering the angle of the axis of the grinding tool for the reading segment portion. Thus, in figure 9, the optical center of the reading segment is shown as being at the dividing line, inasmuch as the radii $R^1$ and $R^2$ have centers on a straight line passing through the dividing line. In Figure 10, the optical center is shown located from 3 to 4 mm. below the dividing line while, in Figure 11, the optical center is shown located a similar distance above the dividing line.

In certain cases, it is quite desirable that the optical center be located from 3 to 4 mm. below the dividing line, inasmuch as the pupil of the eye has this approximate radius. As shown in Figure 10, so locating the optical center from 3 to 4 mm. below the dividing line not only prevents the jumping of the image which apparently occurs as the vision passes over the dividing line, but it has the additional advantage of decreasing the submergence necessary to the production of a lens of the type illustrated in Figure 8, since it tends to tilt the lower portion of the reading segment more nearly toward vertical position.

Figure 12:
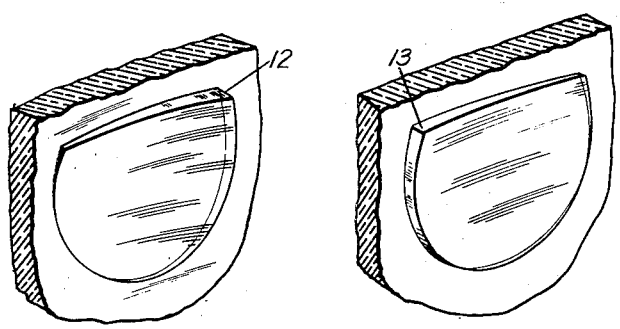
Figure 12 is a perspective view of a lens made in accordance with my invention and having the reading segment of prismatic form with the prism base to the right.
Figure 13:
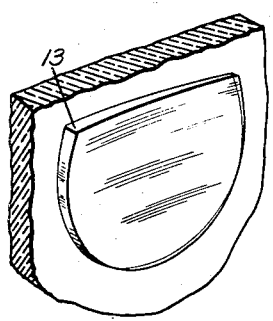
Figure 13 is a perspective view of a lens made in accordance with my invention and having the reading segment of prismatic form with the prism base to the left.

Figures 12 and 13 illustrate the manner in which a lens made in accordance with my invention may be caused to have a prismatic reading segment. In Figure 12, the base of the segment is shown at the right thereof as indicated at 12. In Figure 13, the base of the segment is shown at the left thereof as at 13. It will be apparent that it is possible to locate the base of the prism at any position with relation to the optical center of the distance portion of the lens. Furthermore, the optical center of the reading segment may be readily placed within or outside of the area of the reading segment.

Figure 14:
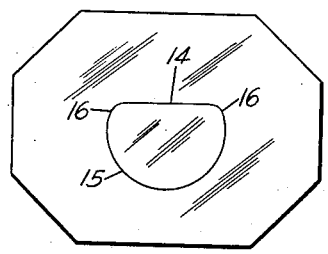
Figure 14 is a plan view of a lens made in accordance with my invention and having the reading segment of modified form.
Figure 15:
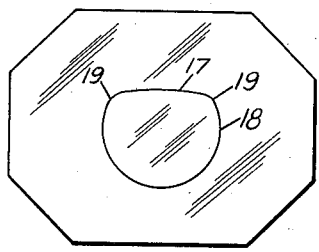
Figure 15 is a plan view of a lens made in accordance with my invention and having the reading segment still further modified as to form.

The modifications illustrated in Figures 14 and 15 represent different shapes of segments which may be used in the embodiment of my invention. In Figure 14, the dividing line 14 is a straight line which is joined to the circular edge 15 by short arcs 16. In Figure 15, the dividing line is a long flat arc 17 which is joined to the circular edge 18 by short arcs 19.

Figure 16:
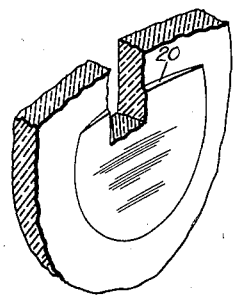
Figure 16 is a perspective view, partly in section, of a further modification of the lens shown in Figure 7 of the drawings.

Figure 16 shows a modified form of a lens made in accordance with my invention, wherein the reading segment portion is not submerged below the surrounding surface of the distance portion but merges with such surface. In this form of lens, it will be noted that the slight shoulder at the dividing line has been removed by the formation of a chamfered surface 20. It should be noted, however, that the slight height of the shoulder which is thus removed makes possible the use of a chamfered surface of such slight area that the normally quick movement of the eye in transference of the vision across the upper dividing line of the minor lenticular surface will preclude any impairment of vision resulting from this chamfered surface.

Figure 17:
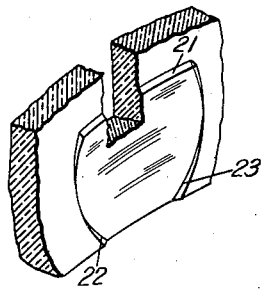
Figure 17 is a perspective view, partly in section, of a further modification of the lens shown in Figure 8 of the drawings.

Figure 17 shows a further modified form of lens made in accordance with my invention, wherein the reading segment is partially submerged so that the shoulder which has been removed by chamfering at 21 was even of less height than in the form shown in Figure 16. Thus, the area of the chamfered surface 21 is even less than the corresponding surface in Figure 16 and also offers no impairment of vision as the eye moves in transference of vision across the upper dividing line. In this figure, it will also be seen that chamfered surfaces 22 and 23 are used to remove the slight shoulder resulting from submergence along the side edges of the reading segment. It will also be appreciated that the shoulders replaced by the chamfered surfaces 22 and 23 are of less height than they would have been if the lowermost area of submergence had been retained in the cutting of the lens from the lens blank.

Figures 18, 19:
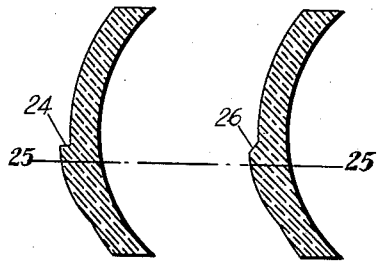
Figure 18 is a vertical sectional view of a lens made in accordance with my invention and having the minor lenticular surface provided upon the convex surface of the lens.
Figure 19 is a view similar to Figure 18 but showing the shoulder at the upper dividing line replaced by a chamfered surface.

Figure 18 shows a modified form of my invention wherein the reading segment is located on the convex surface of the lens. In this illustration, no portion of the reading segment is submerged below the surrounding surface of the distance portion, though it will be noted that the lower edges of this segment merge with this surrounding surface. It should also be noted that the shoulder 24 is located a substantial distance above the horizontal diameter line 25—25 of the circle of which the reading segment forms a part so that the shoulder is, in consequence, substantially decreased in height.

Figure 19 is a still further modification of the type of lens illustrated in Figure 18. The principal difference consists in the fact that the shoulder 24 of Figure 18 has been replaced by the chamfered surface 26 of Figure 19. This chamfered surface is of slight area and facilitates the cleaning of the lens.

The lenses shown in Figures 18 and 19 disclose the reading segment merging at their lower edges with the surrounding surface of the major lenticular portion. It will be understood, however, that these reading segments may be partially submerged in the surrounding convex lenticular surfaces for the purpose of further reducing the slight shoulders at their dividing lines. The shoulder 24 and the chamfered surface 26 of Figures 18 and 19, respectively, are exaggerated in these figures to facilitate reproduction.

Figure 20:
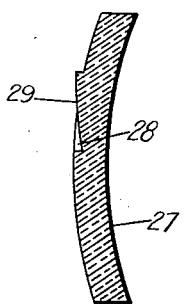
Figure 20 is a vertical sectional view of a modified form of lens made in accordance with my invention wherein the minor lenticular surface is provided on the convex surface of the lens and designed for use as a distance vision portion.
Figure 21:
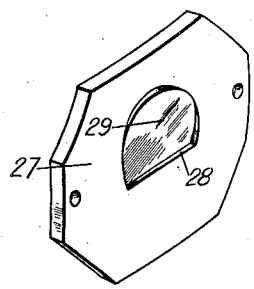
Figure 21 is a perspective view of the lens shown in Figure 20.

Figures 20 and 21 illustrate still further modifications of my invention. In these figures, the major lenticular portion, designated 27, constitutes the reading portion of the lens. The minor lenticular portion, designated 28, constitutes the distance portion. This distance portion is produced by generating on the convex surface of the lens a curved surface 29 of longer radius than that of 28. It will be seen that the external contour of this surface takes the form of a part circle with its arcuate side uppermost. Preferably, its lower edge is located a substantial distance below the horizontal diameter line of the circle from which it is formed. The optical center of this distance portion may be selectively located as desired.

It will be seen from the foregoing that I have produced a lens which has numerous important advantages. Some of these advantages have been made clear in the preceding description.

These advantages include the fact that by providing one of the lenticular surfaces with a partially circular contour with its main dividing line of an elongated nature and located above the horizontal diameter line of the circle from which it is formed, a wide area of vision is provided imediately below this dividing line with a shoulder of much less height than would be possible if the dividing line were located directly at the horizontal diameter line of the circle.

Another advantage arises from the fact that the optical center may be placed at or adjacent the dividing line with the shape of segment shown by me with a much less submergence of the segment than is possible where the upper dividing line of the segment is a portion of the periphery of a circle. Stated another way, if the upper dividing line is a portion of the periphery of a circle, the location of the optical center of the segment at or adjacent to the dividing line can only be attained by submerging the lower part of the segment to a considerably greater degree than is necessary with a segment of the type used by me wherein the upper dividing line is a substanial distance below the periphery of the circle of which the reading segment forms a theoretical part.

Another advantage of my invention arises from the fact that I have found a way of reducing the shoulder at the dividing line by submerging the lower portion of the segment in the blank and then eliminating the relatively deep area of submergence by the manner in which the lens is cut from the blank.

A still further advantage of my invention arises from the fact that I have been able to produce such a slight shoulder at the upper dividing line, and, also, at the lower parts of the side dividing lines, that these shoulders may be eliminated by chamfered surfaces of such slight area that these chamfered surfaces will not impair the optical characteristics of the lenses to which they are applied.

Various other advantages will be apparent from the preceding description and from the appended claims.

Having thus described my invention, what I claim is:

1. A lens blank for making a one-piece multifocal ophthalmic lens comprising a major lenticular surface having a selected radius of curvature and a minor lenticular surface having a different radius of curvature, both of said surfaces being generated on the same side of the lens blank, said minor lenticular surface being less than a full circle with a vertical dimension greater than a radius of the circle but less than the diameter of the circle and having an edge which is elongated and substantially flat and another edge simulating a semi-circular arc connected to said flat edge, said minor lenticular surface being so disposed with relation to said major lenticular surface that the edge which is elongated and substantially flat is more remote from the peripheral boundary of the lens blank than the edge simulating the semi-circular arc, said minor lenticular surface being submerged for a part of its area below the said major lenticular surface and the remainder of its area projecting above the said major lenticular surface.

2. A lens blank for making a one-piece multifocal ophthalmic lens, comprising a major lenticular surface having a selected radius of curvature and a minor lenticular surface having a different radius of curvature, both of said surfaces being generated on the same side of the lens blank, said minor lenticular surface being less than a full circle with a vertical dimension greater than a radius of the circle but less than the diameter of the circle and having an edge which is elongated and substantially flat and another edge simulating a semi-circular arc connected to said flat edge, said minor lenticular surface being so disposed with relation to said major lenticular surface that the edge which is elongated and substantially flat is more remote from the peripheral boundary of the lens blank than the edge simulating the semi-circular arc, said minor lenticular surface being submerged for a part of its area below the said major lenticular surface and the remainder of its area projecting above the said major lenticular surface, the area of said minor surface which is submerged having a shoulder formed along the edge thereof which shoulder extends below the said major lenticular surface and the area of said minor surface which projects above the major lenticular surface having a shoulder along its edge which shoulder projects from the said major lenticular surface.

3. A lens blank for making a one-piece multifocal ophthalmic lens, comprising a major lenticular surface having a selected radius of curvature and a minor lenticular surface having a different radius of curvature, both of said surfaces being generated on the same side of the lens, said minor lenticular surface being less than a full circle with a vertical dimension greater than a radius of the circle but less than the diameter of the circle and having an edge which is elongated and substantially flat and another edge simulating a semi-circular arc connected to said flat edge, said minor lenticular surface so disposed with relation to said major lenticular surface that the edge which is elongated and substantially flat is more remote from the peripheral boundary of the lens blank than the edge simulating the semi-circular arc, said minor lenticular surface being submerged for a part of its area below the said major lenticular surface and the remainder of its area projecting above the said major lenticular surface, the area of said minor surface which is submerged having a shoulder formed along the edge thereof which shoulder extends below the said major lenticular surface and the area which projects above the major lenticular surface having a shoulder along its edge which shoulder projects from the said major lenticular surface, both of said shoulders being chamfered.

4. A one-piece multifocal ophthalmic lens, comprising a major lenticular surface having a selected radius of curvature and a minor lenticular surface having a different radius of curvature, both of said surfaces being generated on the same side of the lens, said minor lenticular surface being less than a full circle with a vertical dimension greater than a radius of the circle but less than the diameter of the circle and having an edge which is elongated and substantially flat and another edge simulating a semi-circular arc connected to said flat edge, the said minor lenticular surface being tilted with respect to the major lenticular surface so as to provide a prism in the minor portion of the finished lens with its base in a prescribed location and to thereby locate the optical center of said minor portion at a prescribed location.

5. A one-piece multifocal ophthalmic lens comprising a major lenticular surface having a selected radius of curvature and a minor lenticular surface having a different radius of curvature, both of said surfaces being generated on the same side of the lens, said minor lenticular surface being less than a full circle with a vertical dimension greater than a radius of the circle but less than the diameter of the circle and having an edge which is elongated and substantially flat and another edge simulating a semi-circular arc connected to said flat edge, said minor lenticular surface being so disposed with relation to said major lenticular surface that the edge which is elongated and substantially flat is more remote from the peripheral boundary of the lens than the edge of arcuate form, said minor lenticular surface being of prismatic form.

6. A one-piece multifocal ophthalmic lens comprising a major lenticular surface having a selected radius of curvature and a minor lenticular surface having a different radius of curvature, both of said surfaces being generated on the same side of the lens, said minor lenticular surface being less than a full circle with a vertical dimension greater than a radius of the circle but less than the diameter of the circle and having an edge which is elongated and substantially flat and another edge simulating a semicircular arc connected to said flat edge, said minor lenticular surface being so disposed with relation to said major lenticular surface that the edge which is elongated and substantially flat is more remote from the peripheral boundary of the lens than the edge of arcuate form, said minor lenticular surface being of prismatic form with the base of the prism located at or adjacent the substantially flat edge.

7. A one-piece multifocal ophthalmic lens made from a blank comprising a major lenticular surface having a selected radius of curvature and a minor lenticular surface having a different radius of curvature, both of said surfaces being generated on the same side of the lens blank, said minor lenticular surface being less than a full circle and having an edge which is elongated and substantially flat and another edge simulating a semicircular arc connected to said flat edge, said minor lenticular surface being so disposed with relation to said major lenticular surface that the edge which is elongated and substantially flat is more remote from the peripheral boundary of the lens blank than the edge simulating the semicircular arc, said minor lenticular surface being submerged for a part of its area below the said major lenticular surface and the remainder of its area projecting above the said major lenticular surface, the finished lens being cut from said blank in such a manner that a portion of the submerged area of the minor lenticular surface is removed so that the minor field of the finished lens will have the form of a circle with its upper portion and lower portion removed.

8. A lens blank for making a one-piece multifocal ophthalmic lens comprising a major lenticular surface having a selected radius of curvature and a minor lenticular surface having a different radius of curvature, both of said surfaces being generated on the same side of the lens blank, said minor lenticular surface being less than a full circle with a vertical dimension greater than a radius of the circle but less than the diameter of the circle and having an edge which is elongated and substantially flat and another edge simulating a semicircular arc connected to said flat edge, the said minor lenticular surface being tilted with respect to the major lenticular surface so as to provide a prism in the minor portion of the finished lens with its base in a prescribed location and to thereby locate the optical center of said minor portion at a prescribed location.

DANIEL D. HUBBELL.